US010644934B1

(12) United States Patent
Hanrahan et al.

(10) Patent No.: US 10,644,934 B1
(45) Date of Patent: May 5, 2020

(54) SYSTEMS AND METHODS FOR CONTROLLING MESSAGE FLOW THROUGHOUT A DISTRIBUTED ARCHITECTURE

(71) Applicant: JPMorgan Chase Bank, N.A., New York, NY (US)

(72) Inventors: Kevin T. Hanrahan, Evanston, IL (US); David John Walsh, Winnetka, IL (US); Shyamal J. Shah, Wesley Chapel, FL (US); Zak Burkhardt, Riverview, FL (US); Babhith Arayullathil, Bangalore (IN); Jeremy Rojas, Miami Shores, FL (US); Renato Marciano, Brandon, FL (US); Leila Elorfi, Wesley Chapel, FL (US); Lance Calamita, Chicago, IL (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 107 days.

(21) Appl. No.: 15/192,042

(22) Filed: Jun. 24, 2016

(51) Int. Cl.
*H04L 12/24* (2006.01)
*H04L 29/06* (2006.01)
*H04L 29/08* (2006.01)

(52) U.S. Cl.
CPC ...... *H04L 41/0803* (2013.01); *H04L 41/0879* (2013.01); *H04L 41/22* (2013.01); *H04L 67/10* (2013.01); *H04L 67/42* (2013.01)

(58) Field of Classification Search
USPC ...................................... 709/221, 200, 206
See application file for complete search history.

(56) References Cited

U.S. PATENT DOCUMENTS

| | | | |
|---|---|---|---|
| 6,983,317 B1 * | 1/2006 | Bishop | H04L 41/065 709/223 |
| 7,225,249 B1 * | 5/2007 | Barry | H04L 41/18 709/227 |
| 7,685,582 B2 | 3/2010 | Haselden | |
| 7,752,599 B2 | 7/2010 | Takacsi-Nagy | |
| 8,042,092 B2 | 10/2011 | Koehler | |
| 8,381,181 B2 | 2/2013 | Davis | |
| 8,407,712 B2 | 3/2013 | Davis | |
| 8,443,351 B2 | 5/2013 | Haselden | |
| 9,696,971 B1 | 7/2017 | Wierda | |
| 9,740,538 B1 | 8/2017 | Cohen | |
| 2003/0023957 A1 | 1/2003 | Bau | |
| 2004/0098154 A1 | 5/2004 | McCarthy | |
| 2004/0260715 A1 | 12/2004 | Mongeon | |
| 2005/0022164 A1 | 1/2005 | Takacsi-Nagy | |

(Continued)

*Primary Examiner* — El Hadji M Sall
(74) *Attorney, Agent, or Firm* — Greenberg Traurig LLP

(57) ABSTRACT

Systems and methods for controlling message flow throughout a distributed architecture are disclosed. In one embodiment, a method for controlling message flow throughout a distributed architecture may include (1) receiving, at a controller executed by a computer processor, a request comprising an identification of a desired server in a network of a plurality of servers and a desired action for the desired server to take; (2) the controller establishing a connection with a message listener associated with the desired server; (3) the controller communicating the message to the message listener; (4) the message listener executing the desired action; and (5) the message listener communicating a status of the desired server to the controller.

18 Claims, 2 Drawing Sheets

(56) References Cited

U.S. PATENT DOCUMENTS

| | | | |
|---|---|---|---|
| 2005/0278452 A1* | 12/2005 | Tankov | G06F 9/542 |
| | | | 709/230 |
| 2006/0048093 A1 | 3/2006 | Jain | |
| 2006/0179150 A1* | 8/2006 | Farley | H04L 12/24 |
| | | | 709/228 |
| 2007/0067373 A1 | 3/2007 | Higgins | |
| 2007/0240099 A1 | 10/2007 | Jahn | |
| 2011/0078426 A1 | 3/2011 | Stoitsev | |
| 2012/0053974 A1 | 3/2012 | Kulkarni | |
| 2014/0181817 A1 | 6/2014 | Muller | |
| 2015/0088982 A1* | 3/2015 | Johnson | H04L 67/34 |
| | | | 709/203 |
| 2016/0072713 A1* | 3/2016 | Mhatre | H04L 47/125 |
| | | | 709/235 |

\* cited by examiner

SYSTEMS AND METHODS FOR CONTROLLING MESSAGE FLOW THROUGHOUT A DISTRIBUTED ARCHITECTURE

BACKGROUND OF THE INVENTION

1. Field of the Invention

The present invention generally relates to computer architecture, and, more specifically, to systems and methods for controlling message flow throughout a distributed architecture.

2. Description of the Related Art

Distributed architectures are common in large organizations. Typically, more than one server may reside in a data center, and each server may process inbound messages. In order to perform maintenance on a server, the server is typically taken off-line and is unavailable.

SUMMARY OF THE INVENTION

Systems and methods for controlling message flow throughout a distributed architecture are disclosed. In one embodiment, a method for controlling message flow throughout a distributed architecture may include (1) receiving, at a controller executed by a computer processor, a request comprising an identification of a desired server in a network of a plurality of servers and a desired action for the desired server to take; (2) the controller establishing a connection with a message listener associated with the desired server; (3) the controller communicating the message to the message listener; (4) the message listener executing the desired action; and (5) the message listener communicating a status of the desired server to the controller.

In one embodiment, the message listener may be executed by the desired server.

In one embodiment, the desired action may be a stop listening action, wherein the message listener stops retrieving messages from a message queue.

In one embodiment, the desired action may be a start listening action, wherein the message listener starts retrieving messages from a message queue.

In one embodiment, the status may indicate a success of the desired action, or a failure of the desired action.

In one embodiment, the message listener executing the desired action may include the message listener retrieving the desired action from a database of managed operations.

In one embodiment, the method may further include the controller updating a stored status of the desired server in a database with the received status.

Distributed message processing architectures are disclosed. According to one embodiment, a distributed message processing architecture may include a controller comprising at least one computer processor and executing a control application; a computer network comprising a plurality of servers, each of the plurality of servers communicating with the controller and associated with a message listener; and a message source. The controller may receive a request comprising an identification of a desired server and a desired action for the desired server to take with at least one message from the message source; establish a connection with a message listener associated with the desired server; communicate the request to the message listener; execute the desired action; and communicate a status of the desired server to the controller.

In one embodiment, the message listener may be executed by the desired server.

In one embodiment, the desired action may be a stop listening action, wherein the message listener stops retrieving messages from a message queue.

In one embodiment, the desired action may be a start listening action, wherein the message listener starts retrieving messages from a message queue.

In one embodiment, the status may indicate a success of the desired action, or a failure of the desired action.

In one embodiment, wherein the message listener may retrieve the desired action from a database of managed operations.

In one embodiment, the controller may update a stored status of the desired server in a database with the received status.

Embodiments disclosed herein may provide the ability to control how messages flow through a distributed architecture across multiple data centers and locations.

Embodiments disclosed herein may allow message listeners (e.g., servers) to be remotely stopped and started for the entire system, within a data center, only for a specific server, etc.

Embodiments disclosed herein may include a user interface that displays the current status of each message listener. The user interface may also support stop and start functions.

Embodiments disclosed herein may facilitate rolling deployments and disaster recovery by allowing message traffic to be transferred to specific data centers and locations and away from problem areas. This may reduce or eliminate downtime.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1:
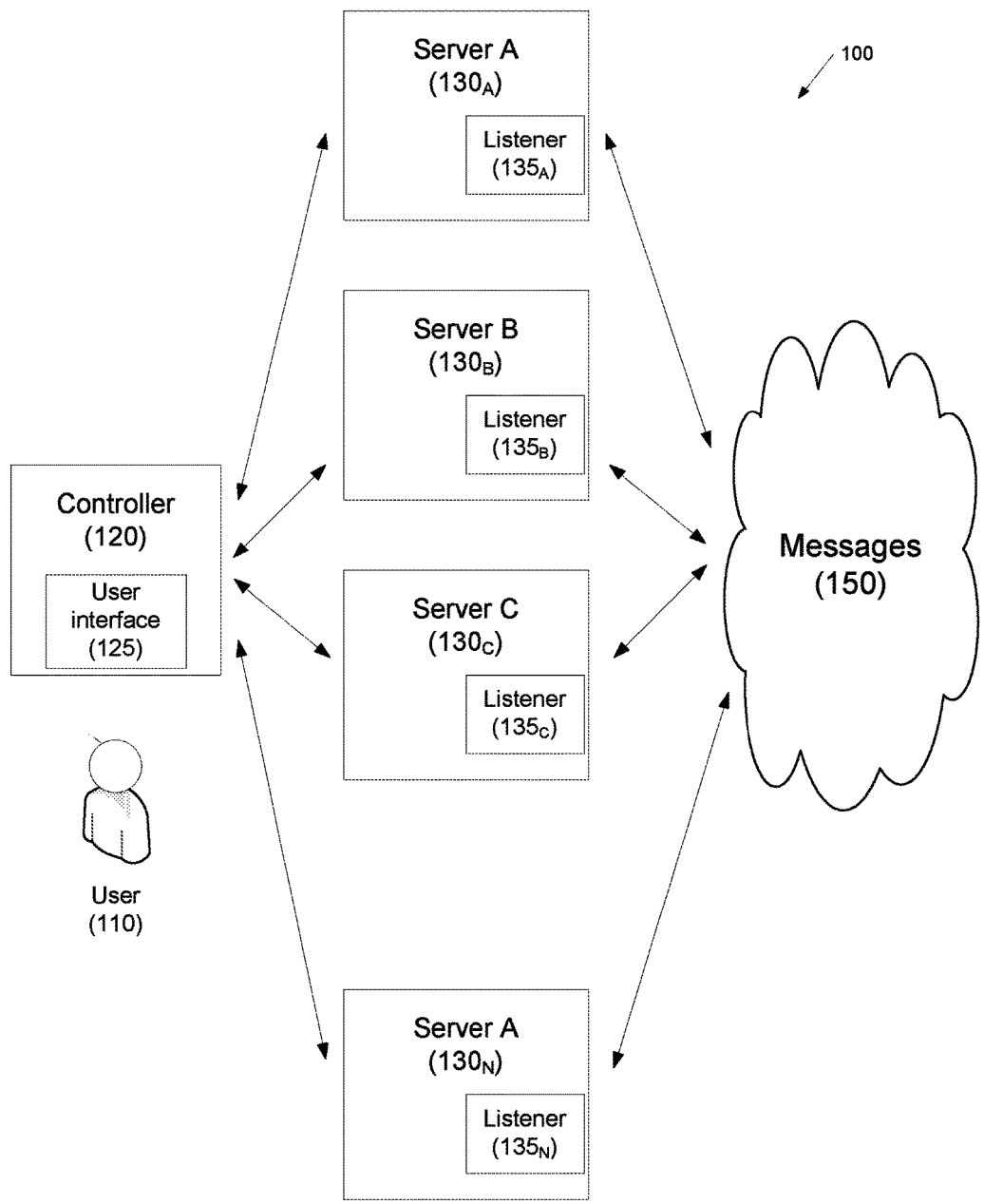
FIG. 1 depicts a system for controlling message flow throughout a distributed architecture according to one embodiment.
Figure 2:
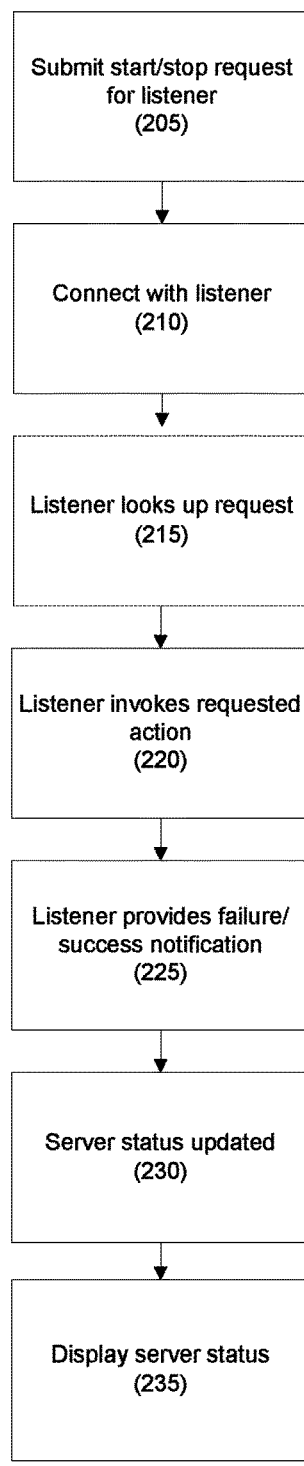
FIG. 2 depicts a method for controlling message flow throughout a distributed architecture according to one embodiment.

Several embodiments of the present invention and their advantages may be understood by referring to FIGS. 1-2.

Embodiments are directed to systems and methods for controlling message flow throughout a distributed architecture. In one embodiment, servers in a network may be provided with message "listeners" that may be started and stopped. When the message listeners are stopped, the message listeners no longer request and/or receive messages to process. Thus, messages are not delivered to programs, applications, etc. that are executed by that server. The programs and applications, however, may continue to execute on the server but will not receive data to process.

Using this framework, individual servers may be controlled as individual message listeners may be addressed. For example, traffic may be isolated from a server that needs maintenance, a deployment, etc. Traffic may also be directed away from servers experiencing maintenance issues. As another example, message listeners may be started/stopped if the sending system is having issues or sending incorrect messages.

Thus, it is not necessary to shut down an entire network of servers. Updates, deployments, etc. may be deployed in a "rolling" manner.

In one embodiment, multiple message listeners may be addressed at the same time. For example, all servers in a data center, all servers executing a specific application, all servers with a particular hardware configuration, etc. may be controlled together as a group.

Referring to FIG. 1, a system for controlling message flow throughout a distributed architecture is disclosed according to one embodiment. System 10 may include controller 120 comprising user interface 125. Controller 120 may comprise any suitable electronic device, including workstations, desktop computers, notebook computers, tablet computers, smartphones, Internet appliances, etc.

In one embodiment, user interface 125 may comprise any interface capable of interacting with user 110. Examples include graphical user interfaces ("GUIs"), touch based interfaces, voice interfaces, biometric interfaces, etc.

System 100 may further comprise a plurality of servers $130_A \ldots 130_N$, and each server may comprise at least one listener $135_A \ldots 135_N$. The number of servers 130 and listeners 135 may vary as is necessary and/or desired.

In one embodiment, listeners $135_A \ldots 135_N$ may be Java managed beans, or MBeans. The MBeans may manage operations, such as "startListenerContaimer{ }" and "stopListenerContainer{ }."

In one embodiment, each server $130_A \ldots 130_N$ may execute programs, applications, etc. that receive and process messages. For example, each listener $135_A \ldots 135_N$ may pull messages as they become available for processing.

In one embodiment, a server 130 may be part of a group of servers. For example, servers $130_A$, $130_B$, and $130_C$ may be associated with a data center, associated with a particular application, associated with particular hardware, etc.

In one embodiment, listeners $135_A \ldots 135_N$ may communicate with controller 120. For example, listeners $135_A \ldots 135_N$ may receive commands (e.g., start listening, stop listening, pause, start with limitations (e.g., consume a certain number of messages, etc.), reroute messages, etc.) from controller 120.

Servers $130_A \ldots 130_N$ and/or listeners $135_A \ldots 135_N$ may receive messages 150 from an internal and/or an external network, such as the Internet, the cloud, etc. In addition, any internal system or external system may be a message source.

Referring to FIG. 2, a method for controlling message flow throughout a distributed architecture is disclosed according to one embodiment.

In step 205, a user may submit a start/stop request for one of more server. In one embodiment, the request may be submitted to a controller via a user interface. In another embodiment, the request may be submitted automatically, such as when there is an indication that a server or server(s) may be offline, having a failure, etc.

In one embodiment, the start/stop request may comprise a Java Ajax request.

In step 210, the controller may connect to a listener associated with each server. In one embodiment, a JMX Connector Client may be created, which may connect to the remote MBean server using, for example, Java Remote Method Invocation ("RMI"). It may further add a notification listener and may send a proxy request to invoke the start or stop method.

In one embodiment, the controller may broadcast the request that is addressed to a specific listener, or group of listeners, to all listeners in the network. In another embodiment, the controller may communicate directly with the intended listener.

In step 215, the listener may look up the request. In one embodiment, the listener container may look up the requested method from its managed operation and may invoke a start or stop on one or more listener container using, for example, a JMS Client API.

In step 220, the listener may invoke the requested action. In one embodiment, if the request is to stop listening, the server and/or the listener will no longer listen for messages. The server, however, may remain online, but the programs and/or applications will no longer request or process messages.

In step 225, the listener may provide a success/failure message to the controller.

In step 230, the listener status may be updated. In one embodiment, the status of all listeners in the system may be updated; in another embodiment, only the status of a listener that had its status change may be updated.

In step 235, the status of the servers may be displayed as is necessary and/or desired.

It should be recognized that although several embodiments have been disclosed, these embodiments are not exclusive and aspects of one embodiment may be applicable to other embodiments.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for controlling message flow throughout a distributed architecture, comprising:
   receiving, at a controller executed by a computer processor, a request comprising an identification of a desired server in a network of a plurality of servers and a desired action for the desired server to take, the desired action selected from the group consisting of starting message retrieval from a message source by the desired server and stopping message retrieval from the message source by the desired server;
   the controller establishing a connection with a message listener executed by the desired server;
   the controller communicating the request to the message listener;
   the message listener executing the desired action;
   the message listener communicating a success/failure message comprising a success or failure of the desired action to the controller; and
   the controller updating a status of the desired server based on the success/failure message.

2. The method of claim 1, wherein the message listener stops retrieving messages from the message source in response to the desired action of stopping message retrieval from the message source.

3. The method of claim 1, wherein the message listener starts retrieving messages from the message source in response to the desired action of starting message retrieval from the message source.

4. The method of claim 1, wherein the message listener executing the desired action comprises:
   the message listener retrieving the desired action from a database of managed operations.

5. A distributed message processing architecture, comprising:
   a controller comprising at least one computer processor and executing a control application;
   a computer network comprising a plurality of servers, each of the plurality of servers executing a message listener and communicating with the controller; and
   a message source;
   wherein:
      the controller receives a request comprising an identification of a desired server and a desired action for the desired server to take, the desired action selected from the group consisting of starting message retrieval from a message source by the desired server and stopping message retrieval from the message source by the desired server;
      the controller establishes a connection with a message listener associated with the desired server;
      the controller communicates the request to the message listener;
      the message listener executes the desired action; and
      the message listener communicates a success/failure message comprising a success or failure of the desired action to the controller; and
      the controller updates a status of the desired server based on the success/failure message.

6. The distributed message processing architecture of claim 5, wherein the message listener stops retrieving messages from the message source in response to the desired action of stopping message retrieval from the message source.

7. The distributed message processing architecture of claim 5, wherein the message listener starts retrieving messages from the message source in response to the desired action of starting message retrieval from the message source.

8. The distributed message processing architecture of claim 5, wherein the message listener executing the desired action comprises:
   the message listener retrieving the desired action from a database of managed operations.

9. The method of claim 1, wherein the request comprises an identification of multiple desired servers in a network of a plurality of servers; and multiple message listeners associated with the multiple desired servers are addressed at the same time as a group by the controller.

10. The distributed message processing architecture of claim 5, wherein the request comprises an identification of multiple desired servers in the network of a plurality of servers; and multiple message listeners associated with the multiple desired servers are addressed at the same time as a group by the controller.

11. The method of claim 1, wherein the group from which the desired action is selected from further consists of pausing message retrieval from the message source by the desired server, starting message retrieval by the desired server with limitations, and rerouting messages from the desired server to another server.

12. The method of claim 11, wherein the message listener pauses retrieving messages from the message source for a specified period of time in response to the pausing the desired server.

13. The method of claim 11, wherein the message listener starts retrieving messages from the message source in accordance to the limitations in response to the starting the desired server with limitations.

14. The distributed message processing architecture of claim 5, wherein the group from which the desired action is selected from further consists of pausing message retrieval from the message source by the desired server, starting message retrieval by the desired server with limitations, and rerouting messages from the desired server to another server.

15. The distributed message processing architecture of claim 14, wherein the message listener pauses retrieving messages from the message source for a specified period of time in response to the stopping the desired server.

16. The distributed message processing architecture of claim 14, wherein the message listener starts retrieving messages from the message source in accordance to the limitations in response to the starting the desired server with limitations.

17. The distributed message processing architecture of claim 15, wherein the message listener reroutes messages it receives from a message queue to another server in response to the starting the desired server with limitations.

18. The distributed message processing architecture of claim 5, wherein the message source is separate from the desired server and the controller.

* * * * *